US010306600B2

(12) United States Patent
Jung et al.

(10) Patent No.: US 10,306,600 B2
(45) Date of Patent: May 28, 2019

(54) METHOD FOR LIMITING USE OF EXCEPTIONAL RESOURCE PERFORMED BY USER EQUIPMENT IN WIRELESS COMMUNICATION SYSTEM AND USER EQUIPMENT USING METHOD

(71) Applicant: LG ELECTRONICS INC., Seoul (KR)

(72) Inventors: Sunghoon Jung, Seoul (KR); Taehun Kim, Seoul (KR); Youngdae Lee, Seoul (KR); Jaehyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/521,261

(22) PCT Filed: Oct. 22, 2015

(86) PCT No.: PCT/KR2015/011241
§ 371 (c)(1),
(2) Date: Apr. 21, 2017

(87) PCT Pub. No.: WO2016/064233
PCT Pub. Date: Apr. 28, 2016

(65) Prior Publication Data
US 2017/0311293 A1    Oct. 26, 2017

Related U.S. Application Data

(60) Provisional application No. 62/066,907, filed on Oct. 22, 2014, provisional application No. 62/076,920, filed on Nov. 7, 2014.

(51) Int. Cl.
*H04W 72/04*      (2009.01)
*H04W 76/10*      (2018.01)
(Continued)

(52) U.S. Cl.
CPC .......... *H04W 72/04* (2013.01); *H04W 76/10* (2018.02); *H04W 76/14* (2018.02); *H04W 76/23* (2018.02); *H04W 76/27* (2018.02); *H04W 76/38* (2018.02)

(58) Field of Classification Search
None
See application file for complete search history.

(56) References Cited

U.S. PATENT DOCUMENTS

2015/0126206 A1* 5/2015 Krishnamurthy ..... H04W 76/18
                                                        455/452.1
2015/0271861 A1* 9/2015 Li ....................... H04W 56/001
                                                        455/426.1
(Continued)

OTHER PUBLICATIONS

ZTE Exceptional Conditions for Mode-2 3GPP TSG-RAN WG2 Meeting #87 Aug. 2014, submitted in the IDS on Apr. 21, 2017 (Year: 2014).*

(Continued)

*Primary Examiner* — Jamaal R Henson
(74) *Attorney, Agent, or Firm* — Lee Hong Degerman Kang & Waimey

(57) ABSTRACT

The present invention provides a method for the performance of a device-to-device (D2D) operation by a user equipment (UE) in a wireless communication system, the method comprising the steps of: starting to use an exceptional resource; determining whether a condition for suspending the use of the exceptional resource is satisfied; and when the condition for suspending the use of the exceptional resource is satisfied, suspending the use of the exceptional resource, wherein the condition for suspending the use of the exceptional resource is a suspension condition in an RRC idle state.

11 Claims, 20 Drawing Sheets

(51) Int. Cl.
*H04W 76/38* (2018.01)
*H04W 76/23* (2018.01)
*H04W 76/27* (2018.01)
*H04W 76/14* (2018.01)

(56) References Cited

U.S. PATENT DOCUMENTS

| | | | | |
|---|---|---|---|---|
| 2015/0373764 | A1* | 12/2015 | Yu | H04W 28/16 370/338 |
| 2016/0094975 | A1* | 3/2016 | Sheng | H04W 72/042 370/216 |
| 2016/0135168 | A1* | 5/2016 | Liu | H04W 72/048 370/329 |
| 2016/0381663 | A1* | 12/2016 | Zhao | H04W 8/005 370/329 |

OTHER PUBLICATIONS

3rd Generation Partnership Project (3GPP), "Technical Specification Group Radio Access Network; Evolved Universal Terrestrial Radio Access (E-UTRA); User Equipment (UE) procedures in idle mode (Release 8)," 3GPP TS 36.304 V8.5.0, Mar. 2009, 30 pages.
3rd Generation Partnership Project (3GPP), "Technical Specification Group Radio Access Network; Evolved Universal Terrestrial Radio Access (E-UTRA); Radio Resource Control (RRC); Protocol specification (Release 8)," 3GPP TS 36.331 V8.0.0, Dec. 2007, 56 pages.
Samsung, Further details regarding "exception conditions," 3GPP TSG-RAN WG2 #87, R2-143083, Aug. 2014, 6 pages.
General Dynamics UK Ltd, "Mode Switching in D2D Communication," 3GPP TSG-RAN2 #87, R2-143089, Aug. 2014, 6 pages.
ZTE, "Exceptional conditions for Mode 2," 3GPP TSG-RAN WG2 #87, R2-143597, Aug. 2014, 6 pages.
Samsung, "Report on [87#30] [LTE/ProSe] Exceptional cases and exit conditions," 3GPP TSG-RAN WG2 #87bis, R2-144306, Oct. 2014, 26 pages.
General Dynamics UK Ltd, "Further discussion on exceptional cases," 3GPP TSG-RAN2 #87bis, R2-144486, Oct. 2014, 5 pages.
PCT International Application No. PCT/KR2015/011241, Written Opinion of the International Searching Authority dated Mar. 25, 2016, 6 pages.

* cited by examiner

METHOD FOR LIMITING USE OF EXCEPTIONAL RESOURCE PERFORMED BY USER EQUIPMENT IN WIRELESS COMMUNICATION SYSTEM AND USER EQUIPMENT USING METHOD

CROSS-REFERENCE TO RELATED APPLICATIONS

This application is the National Stage filing under 35 U.S.C. 371 of International Application No. PCT/KR2015/011241, filed on Oct. 22, 2015, which claims the benefit of U.S. Provisional Application Nos. 62/066,907, filed on Oct. 22, 2014, and 62/076,920, filed on Nov. 7, 2014, the contents of which are all hereby incorporated by reference herein in their entirety.

BACKGROUND OF THE INVENTION

Field of the Invention

The present invention relates to wireless communication, and more particularly relates to a D2D operation method performed by a user equipment (UE) in a wireless communication system and the UE using the method.

Related Art

In an International Telecommunication Union Radio communication sector (ITU-R), a standardization of International Mobile Telecommunication (IMT)-Advanced being a next mobile communication system after a third generation has been performed. The IMT-Advanced is aimed at supporting an Internet Protocol (IP) based multi-media service with a data transmission rate of 1 Gbps in a stop and low speed moving state and a data transmission rate of 1 Gbps in a high speed moving state.

A 3rd Generation Partnership Project (3GPP) is preparing LTE-Advanced (LTE-A) being an improved one of Long Term Evolution (LTE) based on an OFDMA (Orthogonal Frequency Division Multiple Access)/SC-FDMA (Single Carrier-Frequency Division Multiple Access) transmission scheme as a system standard satisfying requirements of IMT-Advanced. The LTE-A is one important candidate for IMT-Advanced.

In recent years, there is growing interest in a Device-to-Device (D2D) technology performing direct communication between devices. In particular, the D2D is attracting attention as a communication technology for a public safety network. A commercial communication network has been rapidly changed to the LTE but a current public safety network is based on a 2G technology in a collision problem and a cost side with an existing communication standard. Request for the technology clearance and an improved service induces an effort to improve the public safety network.

The public safety network has high service requirements (reliability and security) as compared with a commercial communication network. In particular, when coverage of cellular communication is insufficient or is not used, there is a need for direct signal transmission/reception between devices, that is, a D2D operation.

The D2D operation may be signal transmission/reception between adjacent devices to have various advantages. For example, a D2D terminal may perform data communication with a high transmission rate and low delay. Further, the D2D operation may distribute traffic converged in a base station. If the D2D terminal serves as a relay, the D2D terminal may serve to extend coverage of a base station.

Meanwhile, a network may broadcast information relating to a device-to-device (D2D) operation in a specific cell, for example, information to indicate resources for receiving a D2D signal. It is needed to specify how to operate when a terminal receives such information.

SUMMARY OF THE INVENTION

Technical subject to be solved in the present invention provides a D2D operation method performed by a user equipment (UE) in a wireless communication system and the UE using the same.

In an aspect, a method for performance of a device-to-device (D2D) operation by a user equipment (UE) in a wireless communication system is provided. The method comprises starting to use an exceptional resource, determining whether a condition for suspending the use of the exceptional resource is satisfied and when the condition for suspending the use is satisfied, suspending the use of the exceptional resource, and wherein the condition for suspending the use is a suspension condition in an RRC idle state.

The condition for suspending the use may be based on a timer.

The timer may include a first timer and a second timer, and wherein when the first timer is expired, starting to use of the exceptional resource, and when the first timer is expired, starting the second timer, and wherein the condition for suspending the use is when the second timer is expired.

When the first timer is expired, and the second timer is in operation, the second timer may be restarted.

A value of the second timer may be signaled from a network.

A value of the second timer may be a predetermined value.

When the UE receives a service request from an upper layer, the second timer may be restarted.

The second timer may be different from the first timer.

The first timer may be a T300 timer.

The condition for suspending the use may be based on information indicating suspension for the use of the exceptional resource, and wherein the information indicating suspension for the use of the exceptional resource is received from an upper layer.

The information indicating suspension for the use of the exceptional resource may be information indicating that the UE uses the exceptional resource.

The information indicating suspension for the use of the exceptional resource may be information indicating that there are no resources to be transmitted for a direct communication with the UE.

The UE may receive, from the upper layer, information indicating that the exceptional resource is to be used, and wherein when the information indicating that the exceptional resource is to be used is received, the use of an exceptional resource is started.

When the timer is expired, the use of an exceptional resource may be started.

In another aspect, a user equipment (UE) is provided. The UE comprises a radio frequency (RF) unit configured to transmit and receive a radio signal and a processor operatively coupled to the RF unit, and wherein the processor is configured to: start to use an exceptional resource, determine whether a condition for suspending the use of the exceptional resource is satisfied, and when the condition for suspending the use is satisfied, suspend the use of the exceptional resource, and wherein the condition for suspending the use is a suspension condition in an RRC idle state.

According to this invention, the D2D operation performed by the UE in the wireless system may be performed.

DESCRIPTION OF EXEMPLARY EMBODIMENTS

Figure 1:
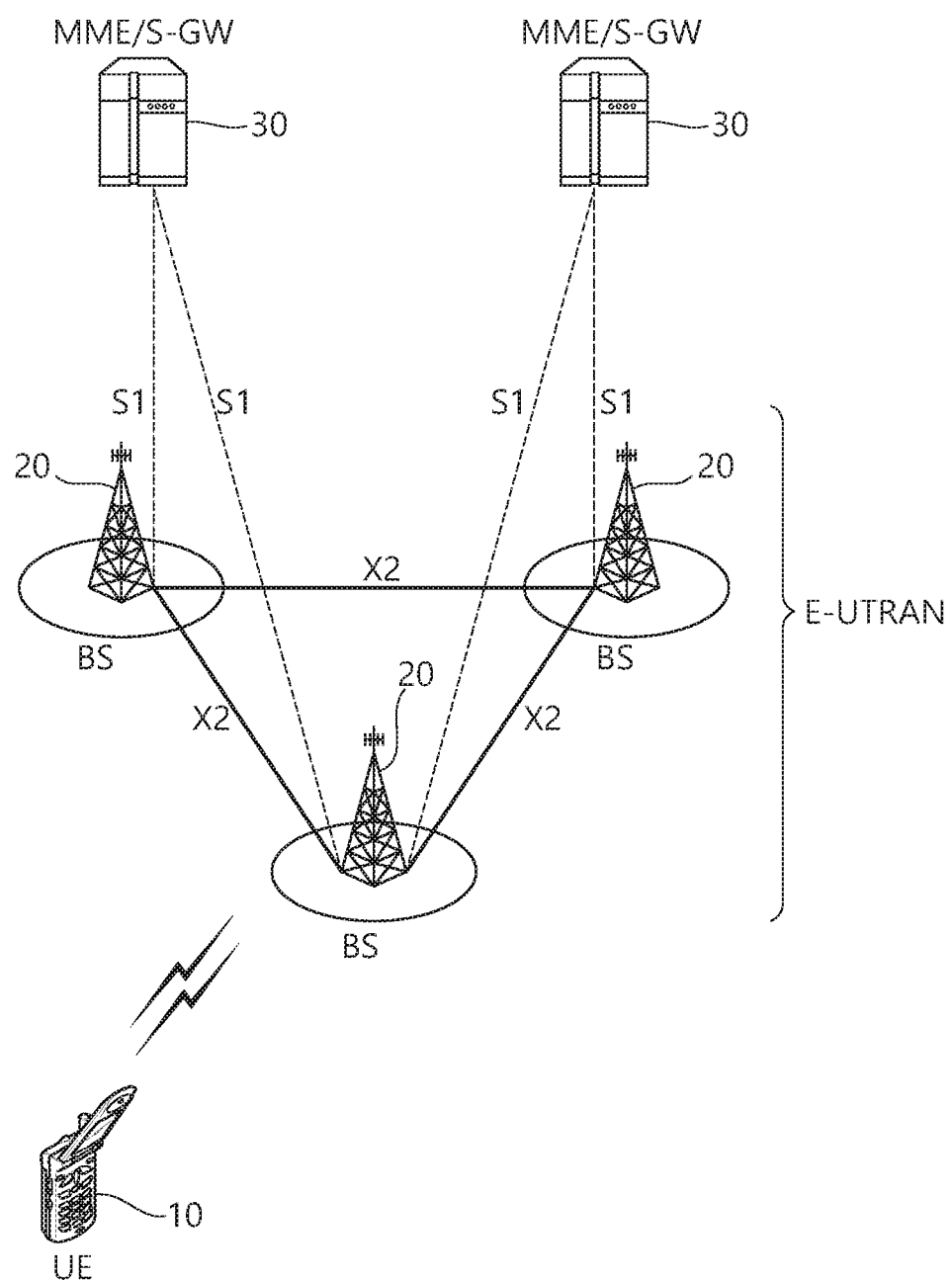
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
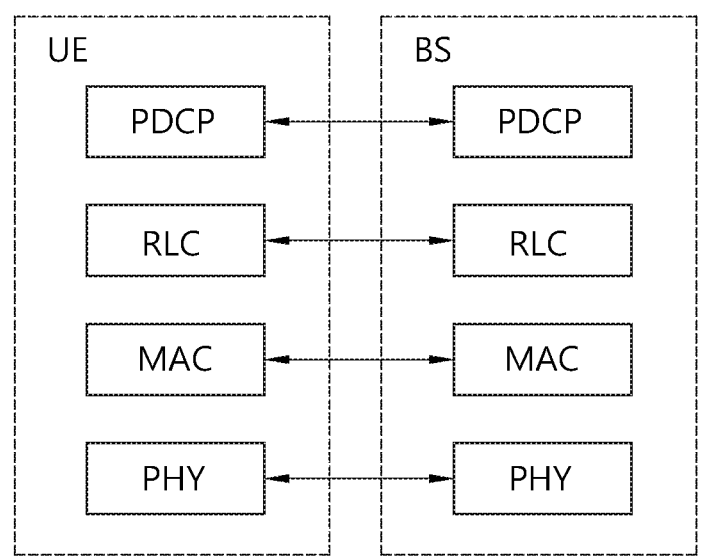
FIG. 2 is a diagram showing a wireless protocol architecture for a user plane.
Figure 3:
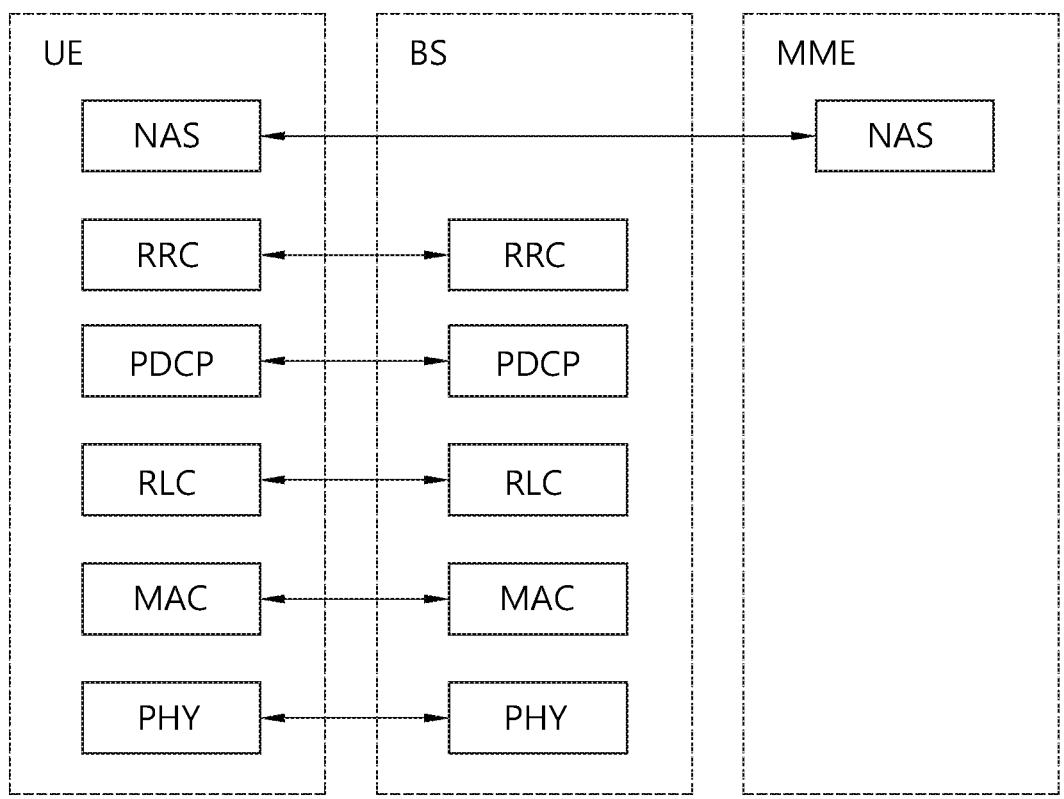
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a procedure of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include a limited number of parameters that are most essential and most frequently transmitted when other information is required to be obtained from a cell. UE first searches for an MIB after downlink synchronization. The MIB may include information, such as an SFN that supports downlink channel bandwidth, a PHICH configuration, and synchronization and operates as a timing criterion and an eNB transmit antenna configuration. The MIB may be transmitted on a broadcast channel (BCH) through broadcasting.

SystemInformationBlockType1 (SIB1) of included SIBs is included in a "SystemInformationBlockType1" message and transmitted. The remaining SIBs other than the SIB1 is included in a system information message and transmitted. To map the SIBs to the system information message may be flexibly configured by a scheduling information list parameter included in the SIB1. In this case, each of the SIBs is included in a single system information message, and only SIBs having the same scheduling requirement value (e.g. cycle) may be mapped to the same system information message. Furthermore, a SystemInformationBlockType2 (SIB2) is always mapped to a system information message corresponding to the first entry within the system information message list of a scheduling information list. A plurality of system information messages may be transmitted within the same cycle. The SIB1 and all the system information messages are transmitted on a DL-SCH.

In addition to broadcast transmission, in an E-UTRAN, the SIB1 may be dedicated-signaled in the state in which it includes a parameter configured like an existing configured value. In this case, the SIB1 may be included in an RRC connection reconfiguration message and transmitted.

The SIB1 includes information related to UE cell access, and defines the scheduling of other SIBs. The SIB1 may include information related to the PLMN identifiers of a network, tracking area code (TAC) and a cell ID, a cell barring status indicative of whether a cell is a cell on which camp-on is possible, the lowest reception level required within a cell which is used as cell reselection criterion, and the transmission time and cycle of other SIBs.

The SIB2 may include radio resource configuration information common to all pieces of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and detecting a change of system information to a primary cell (PCell) only. In a secondary cell (SCell), when a corresponding SCell is added, an E-UTRAN may provide all of pieces of system information related to an RRC connection state operation through dedicated signaling. When system information related to a configured SCell is changed, an E-UTRAN may release an SCell that is taken into consideration and subsequently add the changed system information. This may be performed along with a single RRC connection reconfiguration message. An E-UTRAN may configure parameter values different from a value broadcasted within an SCell that has been taken into consideration through dedicated signaling.

UE needs to guarantee the validity of a specific type of system information, and such system information is called required system information. The required system information may be defined as follows.

If UE is an RRC idle state: The UE needs to be guaranteed so that it has the valid versions of the MIB and the SIB1 in addition to the SIB2 to SIB8. This may comply with the support of a radio access technology (RAT) that is taken into consideration.

If UE is an RRC connection state: The UE needs to be guaranteed so that it has the valid versions of the MIB, the SIB1, and the SIB2.

In general, the validity of system information may be guaranteed up to a maximum of 3 hours after the system information is obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
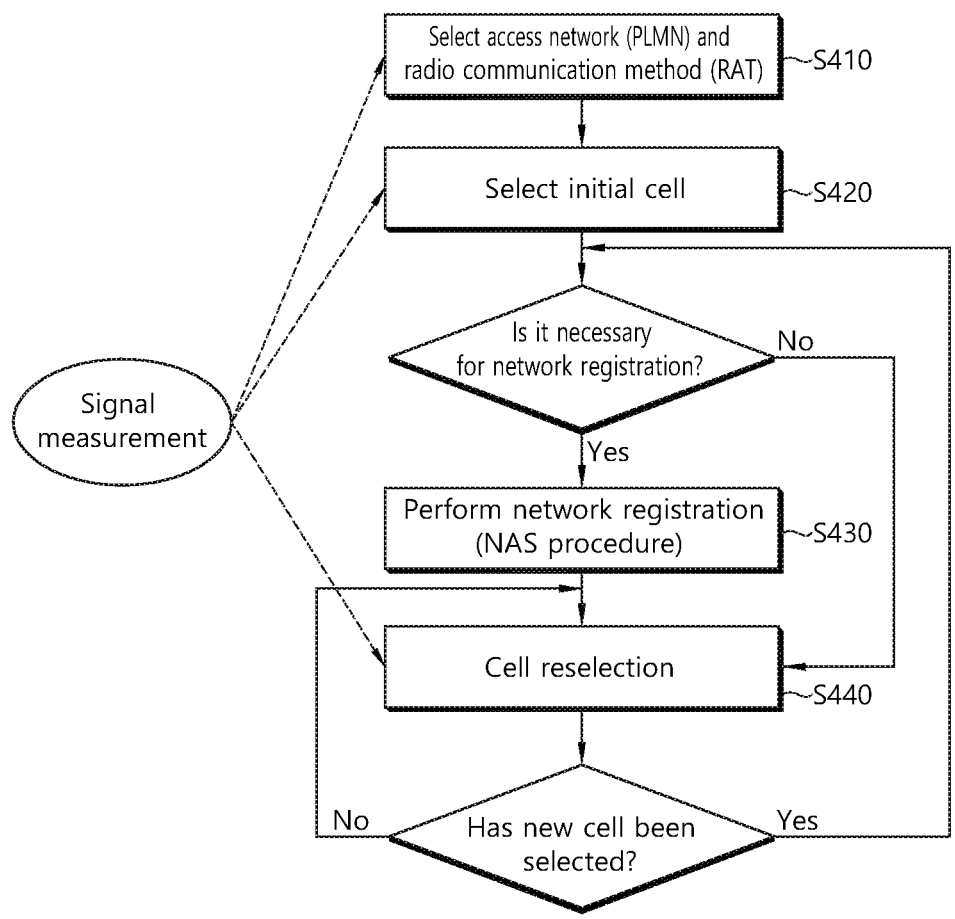
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection procedure, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This procedure is called cell reselection differently from the initial cell selection of the No. 2 procedure. In this case, temporal restriction conditions are placed in order for a cell to be frequently reselected in response to a change of signal characteristic. A cell reselection procedure is described later in detail.

Figure 5:
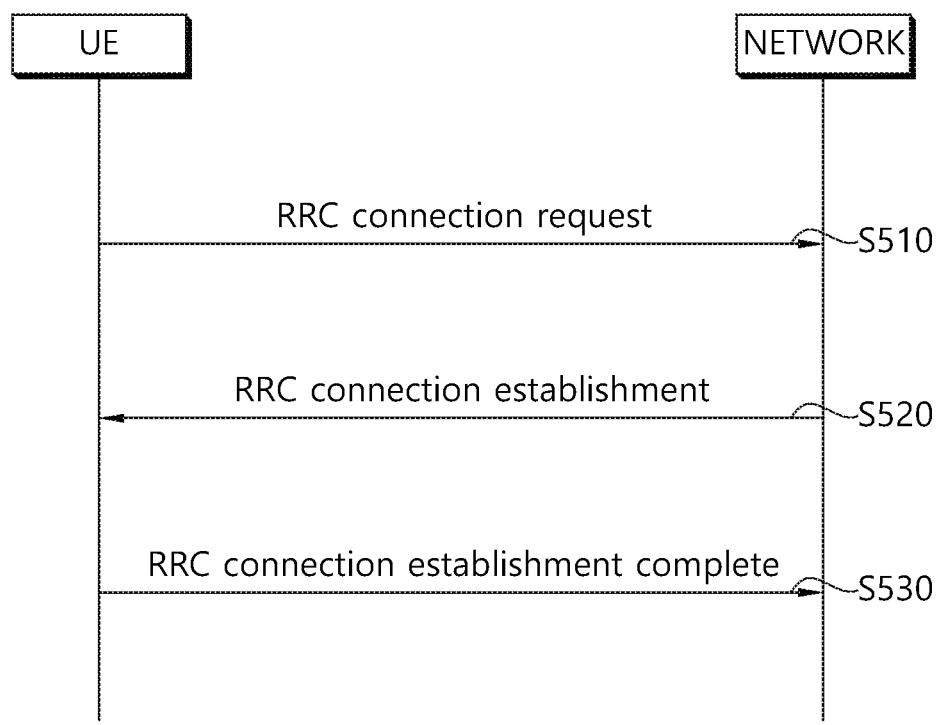
FIG. 5 is a flowchart illustrating a procedure of establishing RRC connection.

FIG. 5 is a flowchart illustrating a procedure of establishing RRC connection.

UE sends an RRC connection request message that requests RRC connection to a network (S510). Herein, the UE may be in RRC idle state. Moreover, when the UE transmits RRC connection request, the UE initiates timer, and the timer may be T300 in the 3GPP TS 36.331.

The network sends an RRC connection establishment message as a response to the RRC connection request (S520). After receiving the RRC connection establishment message, the UE enters RRC connected mode. Herein, the UE may stop the timer which is initiated in the step S510.

The UE sends an RRC connection establishment complete message used to check the successful completion of the RRC connection to the network (S530).

Figure 6:
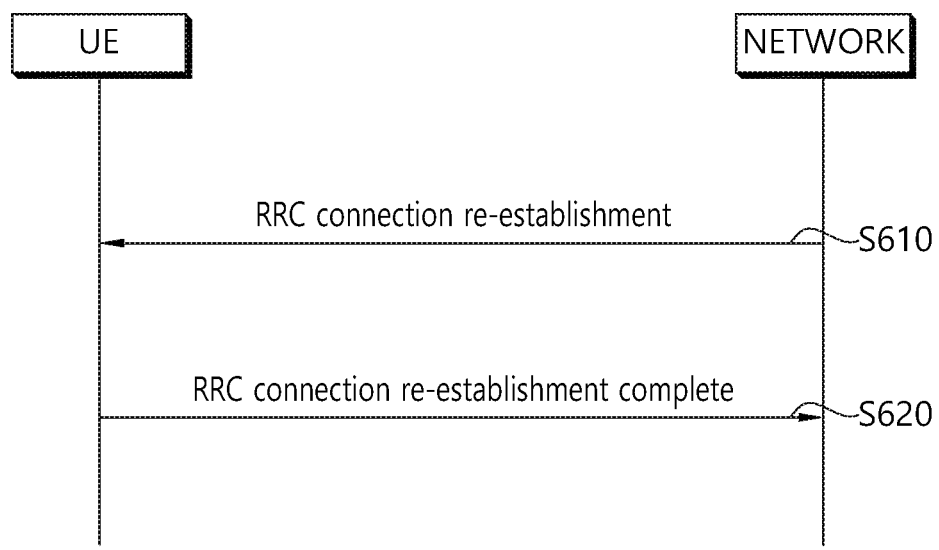
FIG. 6 is a flowchart illustrating an RRC connection reconfiguration procedure.

FIG. 6 is a flowchart illustrating an RRC connection reconfiguration procedure. An RRC connection reconfiguration is used to modify RRC connection. This is used to establish/modify/release RBs, perform handover, and set up/modify/release measurements.

A network sends an RRC connection reconfiguration message for modifying RRC connection to UE (S610).

As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection procedure is basically divided into two types.

The first is an initial cell selection procedure. In this procedure, UE does not have preliminary information about a wireless channel. Accordingly, the UE searches for all wireless channels in order to find out a proper cell. The UE searches for the strongest cell in each channel Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection procedure. If the UE has only to search for a cell that satisfies the cell selection criterion, the UE selects the corresponding cell. If a suitable cell that satisfies the cell selection criterion is not retrieved though such a procedure, the UE performs an initial cell selection procedure.

A cell selection criterion may be defined as in Equation 1 below. Following Equation 1 can be referred to as measurement for determining whether or not S-criterion is satisfied.

Srxlev>0 AND Squal>0, where:

$Srxlev = Q_{rxlevmeas} - (Q_{rxlevmin} + Q_{rxlevminoffset}) - P_{compensation}$, $Squal = Q_{qualmeas} - (Q_{qualmin} + Q_{qualminoffset})$ [Equation 1]

In this case, in Equation 1, the variables may be defined as in Table 1 below.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | max($P_{EMAX} - P_{PowerClass}$, 0) (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Qrxlevminoffset and Qqualminoffset, that is, signaled values, are the results of periodic discovery for a PLMN having higher priority while UE camps on a normal cell within a VPLMN, and may be applied only when cell selection is evaluated. As described above, during the periodic discovery of a PLMN having higher priority, UE may perform cell selection evaluation using parameter values stored from another cell of the PLMN having such higher priority.

After UE selects any cell through a cell selection procedure, the intensity or quality of a signal between the UE and a BS may be changed due to the mobility of the UE or a change of a radio environment. Accordingly, if the quality of the selected cell is changed, the UE may select another cell providing better quality.

After the UE selects a specific cell through the cell selection procedure, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a procedure is called cell reselection. In general, a basic object of the cell reselection procedure is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection procedure compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection procedure is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency. For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection. For the intra-frequency or inter-frequency cell reselection, a network may provide UE with a cell reselection black list used in cell reselection.

The UE does not perform cell reselection on a cell included in the black list.

Ranking performed in a cell reselection evaluation procedure is described below.

A ranking criterion used to give the priority of a cell is defined as in Equation 2.

$$R_s = Q_{meas,s} + Q_{hyst}, R_n = Q_{meas,n} - Q_{offset}$$ [Equation 2]

In Equation 2, Rs is the ranking criterion of a serving cell on which UE now camps, Rn is the ranking criterion of a neighboring cell, Qmeas,s is the quality value of the serving cell measured by the UE, Qmeas,n is the quality value of the neighboring cell measured by the UE, Qhyst is a hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell res election.

Hereinafter, radio link failure (RLF) will be described.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
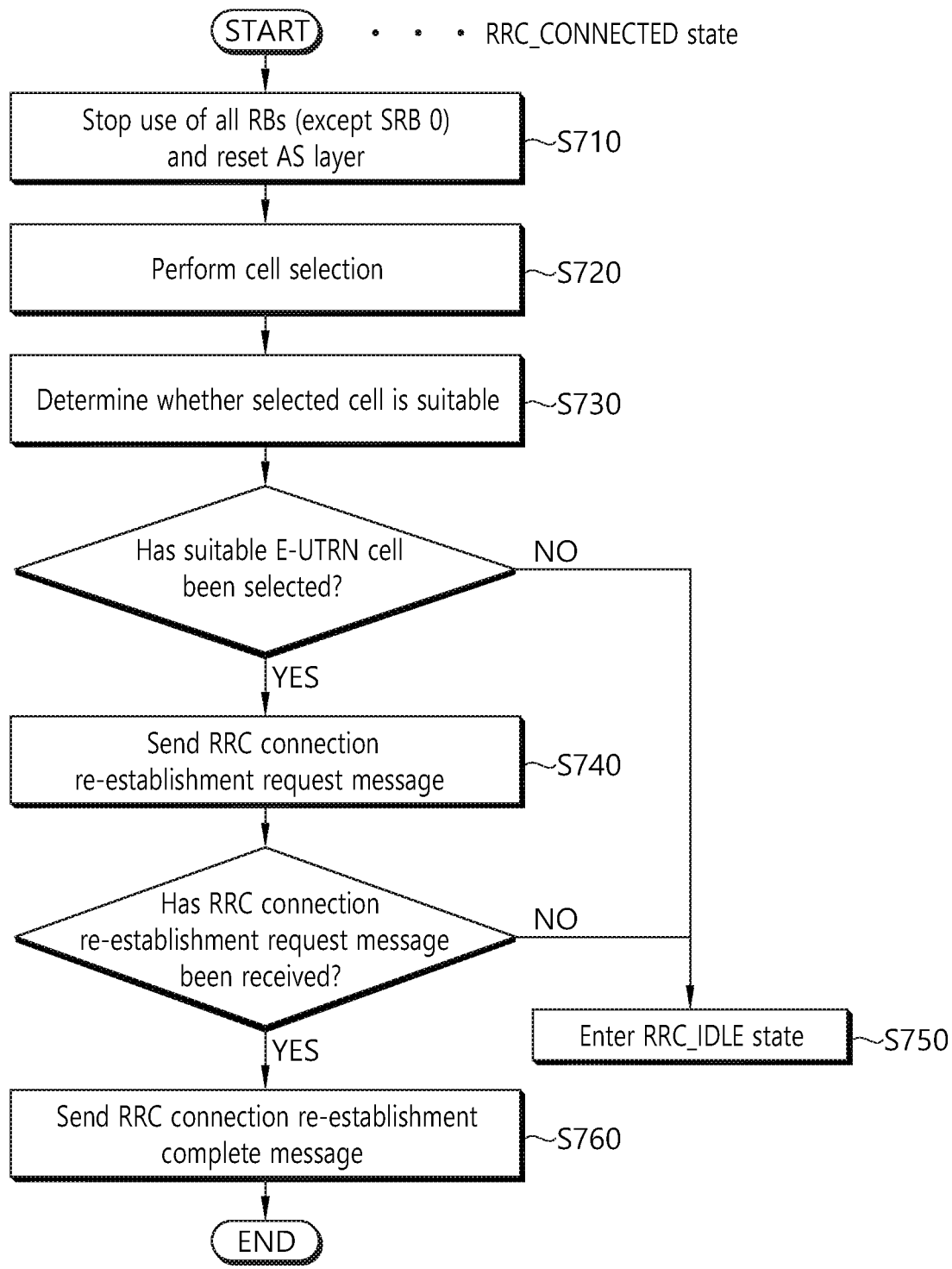
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
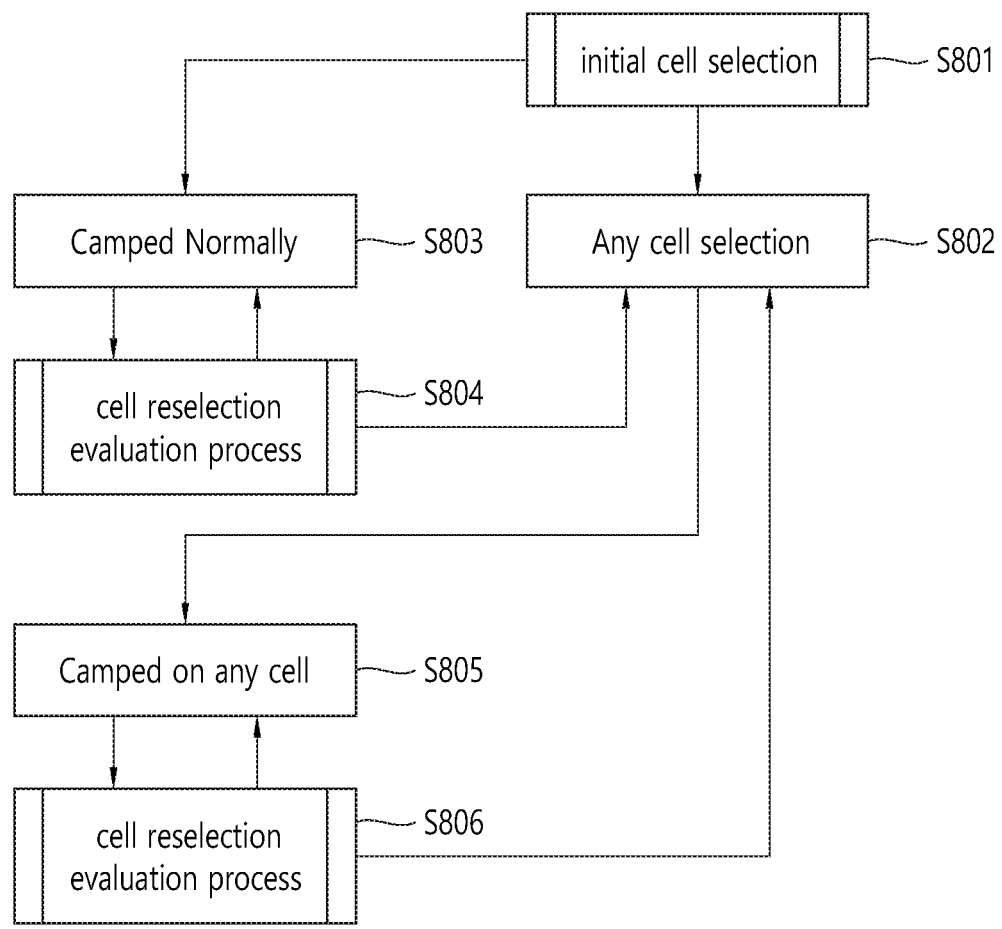
FIG. 8 illustrates sub states where the terminal may have in an RRC_IDLE state and a sub state transition process.

FIG. 8 illustrates sub states where the terminal may have in an RRC_IDLE state and a sub state transition process.

Referring to FIG. 8, a terminal performs an initial cell selection process (S801). The initial cell selection process may be performed when there is no stored cell information with respect to the PLMN or a suitable cell is not found.

If the suitable cell is not found in the initial cell selection process, the terminal transitions to an any cell selection state (S802). The optional cell selection state represents a state which does not camp on in both of a suitable cell and an acceptable cell. The optional cell selection state is a state attempted by the terminal in order to find an acceptable cell of an optional PLMN which may camp on. When the terminal finds no cells which may camp on, the terminal is continuously maintained in an optional cell selection state until the acceptable cell is found.

If the suitable cell is found in the initial cell selection process, the state transits to a normal camp state (S803). The normal camp state represents a state which camps on the normal cell. A paging channel is selected according to information given through system information to motor, and an evaluation process for cell reselection may be performed.

In the normal camp state (S803), if a cell reselection evaluation process (S804) is caused, the cell reselection evaluation process (S804) is performed. If a suitable cell is found in the cell reselection evaluation process (S804), the terminal again transits to the normal camp state (S803).

If an acceptable cell is found in the any cell selection state (S802), the terminal transits to an any cell camped state (S805). The any cell camped state (S805) represents a state of camping on an acceptable cell.

In the any cell camped state (S805), the terminal may select a paging channel according to information given through system information to monitor, and may perform a cell reselection evaluation process (S806). If the acceptable cell is not found in the cell reselection evaluation process (S806), the terminal transits the any cell selection state (S802).

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 9:
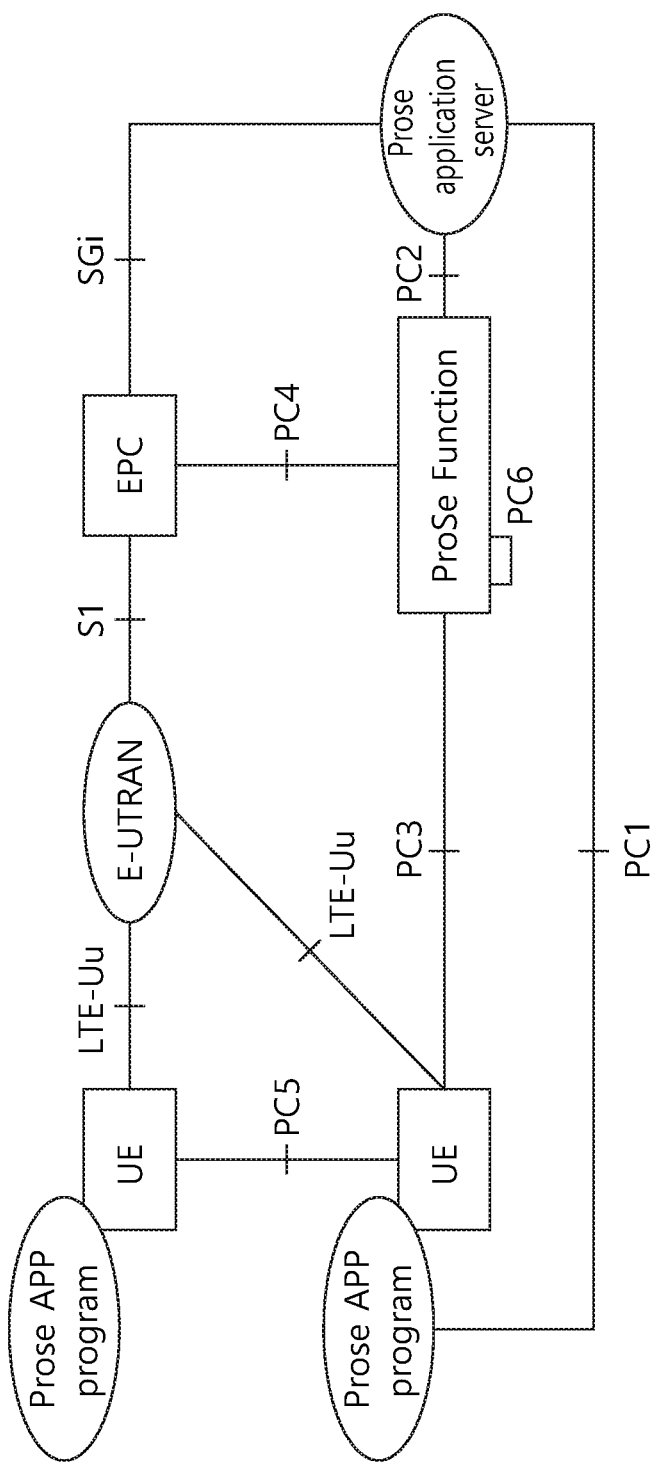
FIG. 9 illustrates a reference structure for a ProSe.

FIG. 9 illustrates a reference structure for a ProSe.

Referring to FIG. 9, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.

Interworking via a reference point towards the 3rd party applications

Authorization and configuration of the UE for discovery and direct communication)

Enable the function of the EPC level ProSe discovery

ProSe related new subscriber data and handling of data storage, and also handling of ProSe identities Security related function Provide control towards the EPC for policy related function Provide function for charging (via or outside of EPC, e.g., offline charging))

Hereinafter, a reference point and a reference interface will be described in a reference structure for the ProSe.

PC1: a reference point between a ProSe application program in the terminal and a ProSe application program in a ProSe application server. The PC1 is used to define signaling requirements in an application level.

PC2: is a reference point between the ProSe application server and a ProSe function. The PC2 is used to define an interaction between the ProSe application server and a ProSe function. An application data update of a ProSe database of the ProSe function may be an example of the interaction.

PC3: is a reference point between the terminal and the ProSe function. The PC3 is used to define an interaction between the terminal and the ProSe function. Configuration for ProSe discovery and communication may be an example of the interaction.

PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.

PC5: is a reference point to use control/user plane for discovery, communication, and relay between terminals, and 1:1 communication.

PC6: is a reference point to use a function such as ProSe discovery between users included in different PLMNs.

SGi: may be used for application data and application level control information exchange.

<ProSe Direct Communication (D2D Communication)>.

The ProSe direct communication is a communication mode where two public safety terminals may perform direct communication through a PC5 interface. The communication mode may be supported in both of a case of receiving a service in coverage of E-UTRAN or a case of separating the coverage of E-UTRAN.

Figure 10:
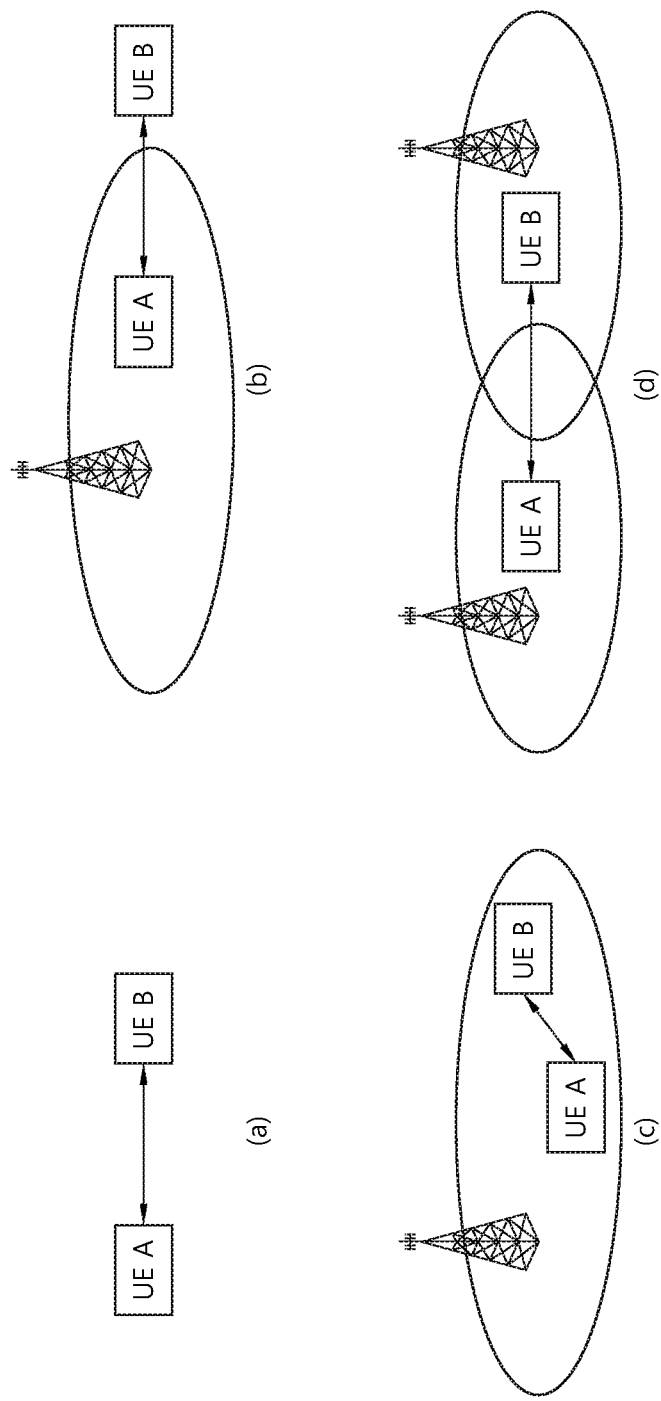
FIG. 10 illustrates arrangement examples of terminals performing ProSe direct communication and cell coverage.

FIG. 10 illustrates arrangement examples of terminals performing ProSe direct communication and cell coverage.

Referring to FIG. 10(a), UEs A and B may be located outside of the cell coverage. Referring to FIG. 10(b), the UE A may be located in the cell coverage and the UE B may be located outside of the cell coverage. Referring to FIG. 10(c), both of UEs A and B may be located in the cell coverage. Referring to FIG. 10(d), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.

Source layer-2 ID: The source layer-2 ID identifies a sender of a packet in a PC 5 interface.

Purpose layer-2 ID: The purpose layer-2 ID identifies a target of a packet in a PC 5 interface.

SA L1 ID: The SA L1 ID represents an in an ID in a scheduling assignment (SA) in the PC 5 interface.

Figure 11:
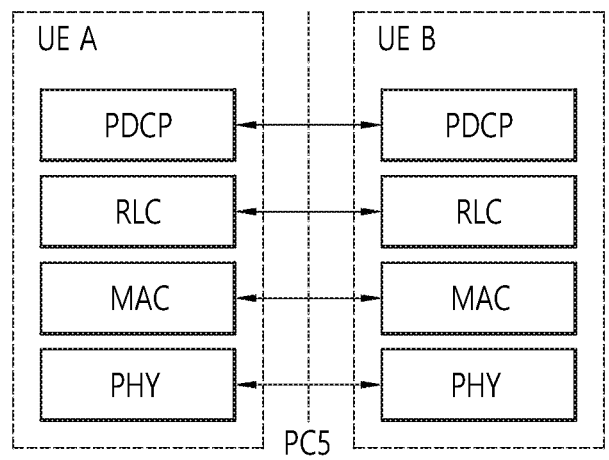
FIG. 11 illustrates a user plane protocol stack for the ProSe direct communication.

FIG. 11 illustrates a user plane protocol stack for the ProSe direct communication.

Referring to FIG. 11, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio Resource Assignment for ProSe Direct Communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 12:
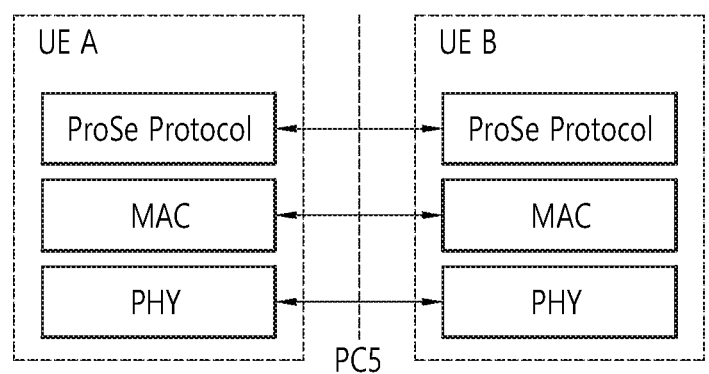
FIG. 12 illustrates a PC 5 interface for D2D discovery.

FIG. 12 illustrates a PC 5 interface for D2D discovery.

Referring to FIG. 12, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

Hereinafter, an RRC connection failure and a timer will be described.

Figure 13:
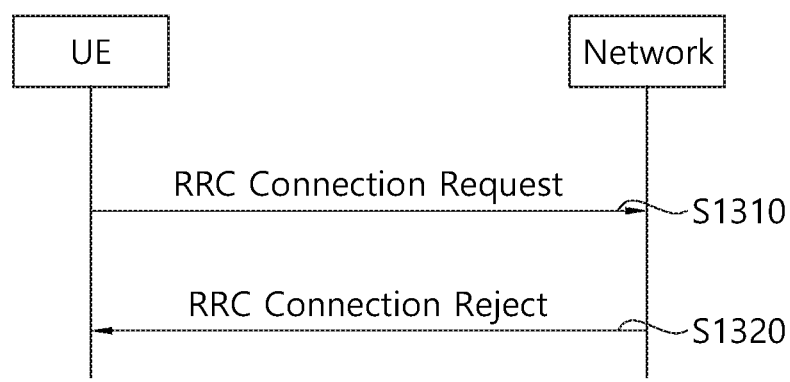
FIG. 13 is a flowchart illustrating a process of rejecting an RRC connection by a network.

FIG. 13 is a flowchart illustrating a process of rejecting an RRC connection by a network.

Referring to FIG. 13, the UE may send an RRC Connection Request message to the network (S1310). When the UE sends an RRC connection request message to the network, it may start a timer, and the timer in this case may be T300 of 3GPP TS36.331.

The network may send an RRC Connection Reject message in response to the RRC connection request (S1320). In this case, if the UE receives the RRC connection reject message, the UE may suspend the timer started in step S1310.

Figure 14:
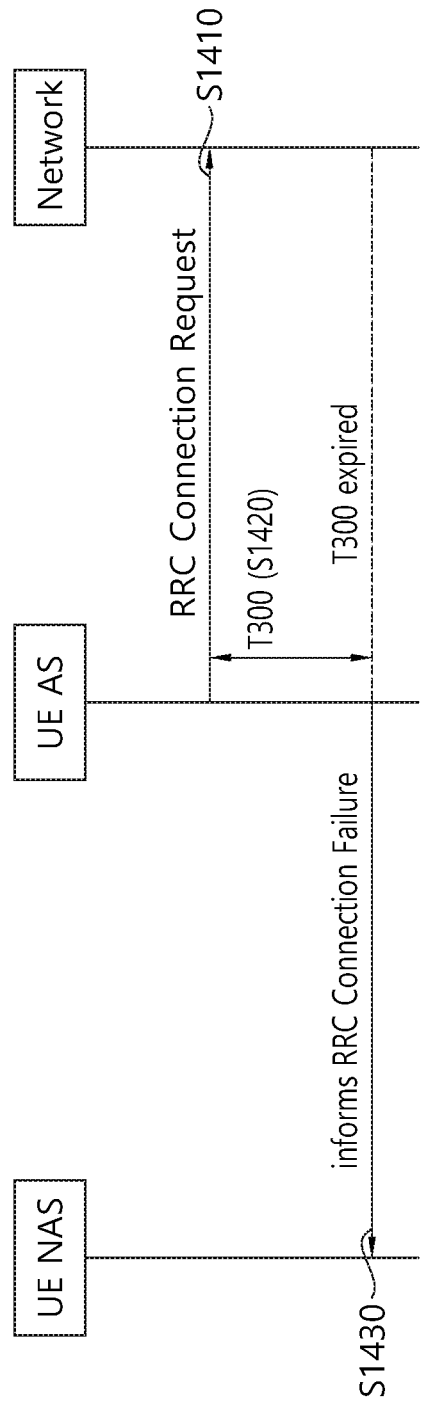
FIG. 14 is a flowchart illustrating a process at the expiration of a timer during an RRC connection request.

FIG. 14 is a flowchart illustrating a process at the expiration of a timer during an RRC connection request.

Referring to FIG. 14, the UE may send an RRC Connection Request message to the network (S1410), and the UE in this case may mean a UE AS (Access Stratum).

When sending the RRC connection request message to the network, the UE may start a timer (S1420), and the timer in this case may be T300 of 3GPP TS 36.331.

If the timer expires when the UE sends an RRC connection request message to the network, the UE informs an upper layer (Non-Access Stratum; NAS) that the RRC connection has failed (S1430). In addition, if the timer expires, the UE may initialize an MAC, release the MAC configuration, and re-establish the RLC for all configured resource blocks. In addition, when the timer expires, the UE may store connection establishment failure information.

Hereinafter, the present invention will be described in detail.

The UE may use exceptional resources in specific cases, to ensure continuous service of ProSe operation. In this case, the exceptional resource means resources available for an exceptional case defined in the RRC_IDLE mode. The exceptional case will be described later. In the exceptional case, the UE may use the exceptional resource. Although the use of exceptional resources is allowed to ensure a continuous service level of ProSe direct communication, the use of exceptional resources should be strictly restricted to protect cellular traffic from interference that may be caused by ProSe direct communications using exceptional resource.

If the RRC connection establishment attempt continues to fail, unexpected results may occur where the UE continuously uses the above exceptional resource as a cell broadcast transmission resource. It is not intended or encouraged that the UE continuously uses an exceptional resource (that is, the above-mentioned exceptional resource is continuously used as a cell broadcast transmission resource), and for the cases that the UE continuously uses the exceptional resource, it is against the original purpose of the exceptional resource that was supposed to use the exceptional resource only for 'the exceptional case.' However, when the network coverage is unstable (e.g., a large scale disaster), a situation may occur in which the UE continuously uses exceptional resources. Hereinafter, an example in which exceptional resources are continuously used will be described in detail with reference to FIG. 15.

Figure 15:
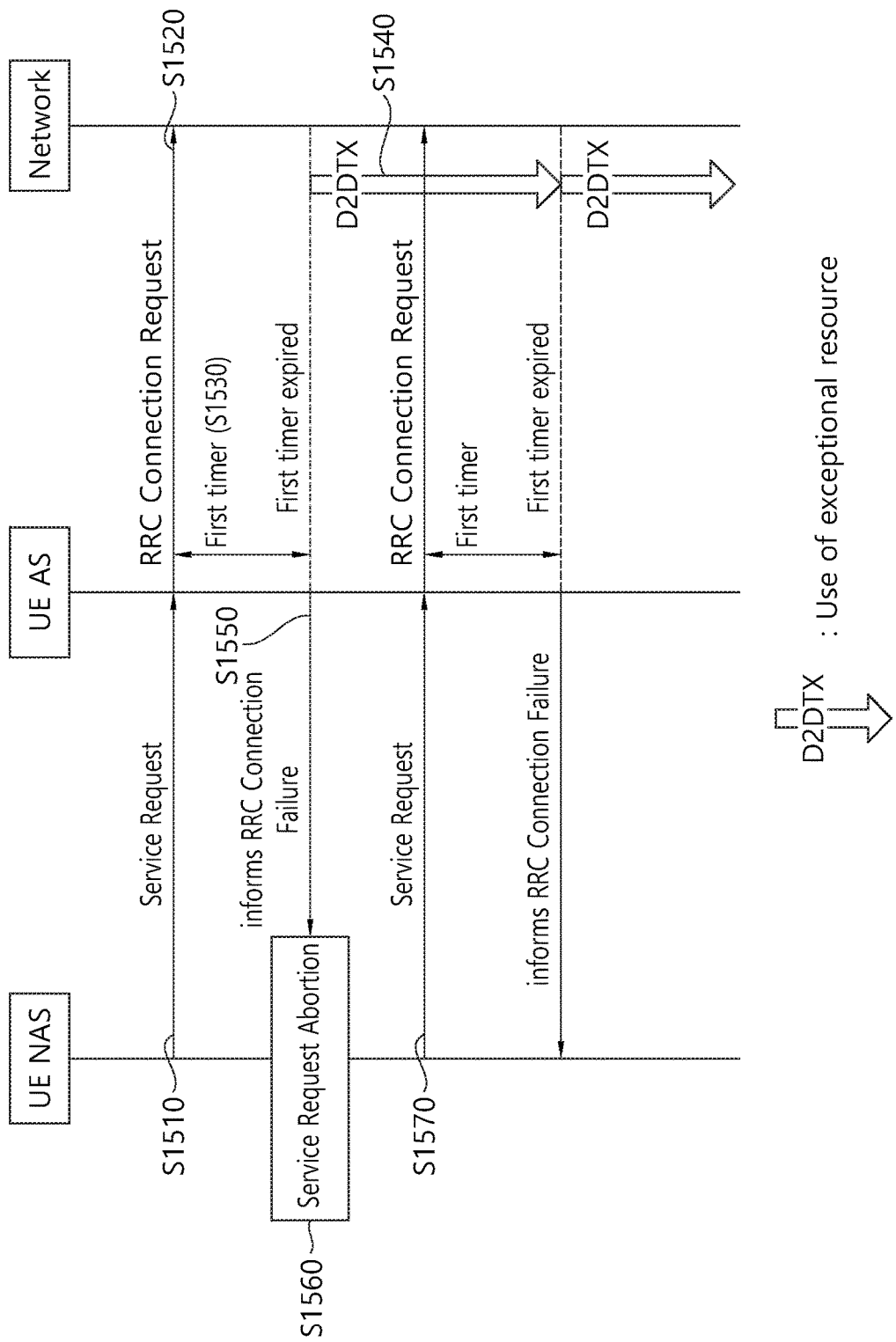
FIG. 15 is a flowchart showing an example in which exceptional resources are continuously used.

FIG. 15 is a flowchart showing an example in which exceptional resources are continuously used.

Referring to FIG. 15, in the RRC_IDLE state, the UE may receive a service request for D2D from an upper layer (S1510). Herein, the UE may denote a UE AS, the upper layer may denote a UE NAS, where the UE NAS denotes an upper layer in a UE, and the UE AS may be a lower layer in the UE. Hereinafter, for convenience of description, it is assumed that an upper layer (e.g., UE NAS) of a UE is referred to as 'an upper layer' and a lower layer (e.g., a UE AS) of the UE is referred to as a 'UE.'

When the UE receives a service request for D2D from an upper layer, the UE may transmit an RRC connection request message to the network for an RRC connection attempt (S1520), and performs an RRC connection procedure. In this case, the details of the RRC connection request message and the RRC connection procedure are as described above.

When the UE transmits an RRC connection request message to the network, the UE starts a timer (S1530). The timer may mean T300 in TS 36.331, and the T300 may be defined as in Table 2 below.

TABLE 2

| Timer | Start | Stop | At expiry |
|---|---|---|---|
| T300 | Transmission of RRCConnectionRequest | Reception of RRCConnectionSetup or RRCConnectionReject message, cell re-selection and upon abortion of connection establishment by upper layers | Perform the actions as specified in 3GPP TS 36.331, 5.3.3.6 and/or FIG. 14 of present application |

If the UE fails the RRC connection attempt (i.e., the timer expires) until the timer started by the UE expires, the UE starts to use an exceptional resource for D2D (S1540).

If the timer expires, the UE informs the upper layer of RRC connection establishment failure information (S1550). The RRC connection establishment failure information is information indicating that the UE has failed to make an RRC connection with the network, and the details of the RRC connection establishment failure information are as described above.

When the upper layer of the UE receives the RRC connection establishment failure information, the upper layer of the UE aborts the service request (S1560).

Thereafter, when there is still data to be transmitted by the UE, the upper layer of the UE triggers the service request (S1570). That is, if there is still data to be transmitted by the UE, the UE receives a service request for the D2D from the upper layer of the UE.

Thereafter, the UE repeats the above-mentioned steps S1520 to S1570 until the RRC connection is established. In this case, the repetition of steps S1520 to S1570, that is, each service request process may refer to a new service request process.

As shown in FIG. 15, when an upper layer of the UE starts a new service request process and the UE fails to make an RRC connection corresponding to the service request process until the timer expires, the UE may consider that reusing the exceptional resource which was started being used from the step S1540. That is, if the problem (i.e., connection establishment failed until the timer expires) continues while the UE continues the connection establishment, triggering the service request at the upper layer of the UE makes the UE continue to use the exceptional resource. As the UE continues to use the exceptional resources, potential interference may occur in the network, and problems may be occurred in that potential interference may cause an increase in cellular traffic.

Therefore, the situation in which the UE continuously uses an exceptional resource needs to be prevented, and restriction on the use of an exceptional resource by the UE is required. Hereinafter, a method and apparatus for preventing the UE from continuously using exceptional resources will be described in more detail.

Figure 16:
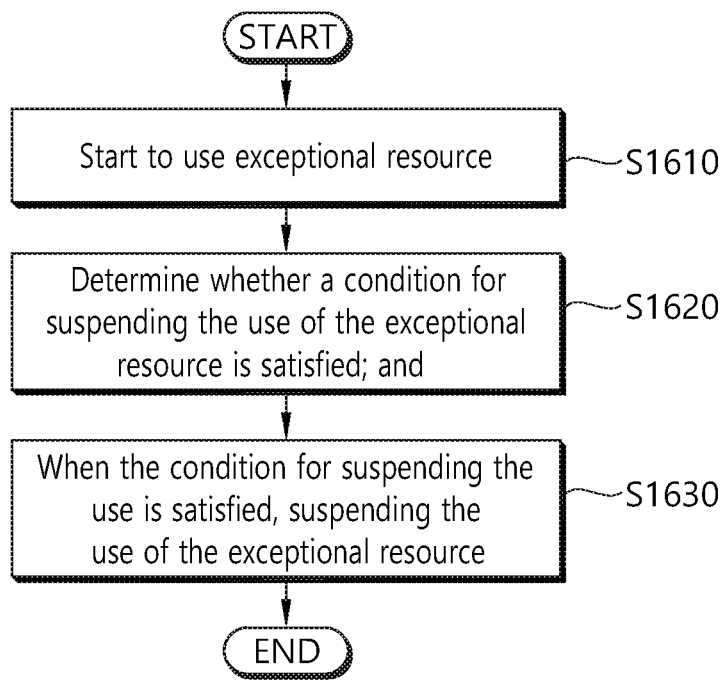
FIG. 16 is a flowchart of an exceptional resource use restriction process according to an embodiment of the present invention.

FIG. 16 is a flowchart of an exceptional resource use restriction process according to an embodiment of the present invention.

Referring to FIG. 16, the UE starts to use an exceptional resource (S1610). An entry condition of an exceptional case where the UE is allowed to use an exceptional resource for direct communication is as follows.

Entry conditions in RRC_CONNECTED state: 1) Detect problems in physical layer (3GPP TS 36.331, start of T310), 2) Radio Link Failure (RLF) and RRC connection re-establishment start (3GPP TS 36.331, start of T311), 3) RRC connection re-establishment request transmission (3GPP TS 36.331, start of T301). In this case, details of T301, T310, and T311 are shown in Table 3 below.

Thereafter, the UE determines whether a condition for suspending use of the exceptional resource (S1620) is satisfied. The above-mentioned for suspending the use of the exceptional resource, that is, an exit condition of exceptional case is as follows.

Exit condition at RRC_CONNECTED: none of the T310, T311 and T301 timers are in operation.

Exit conditions in RRC_IDLE: 1) when the second timer expires and 2) the UE receives indication for suspending the use of the exceptional resource from the upper layer, and the second timer may be intended to be a separate timer different from the first timer, and the upper layer may mean a UE NAS. Details of the condition for suspending the use of the exceptional resource will be described later.

If the condition for suspending the use of the exceptional resource is satisfied, the UE suspends use of the exceptional resource used by the UE (S1630).

Hereinafter, the condition for suspending the use of the exceptional resource 1) when the second timer expires, and 2) for the case where the UE receives the indication for suspending the use of the exceptional resource from the upper layer, respectively, will be described.

Figure 17:
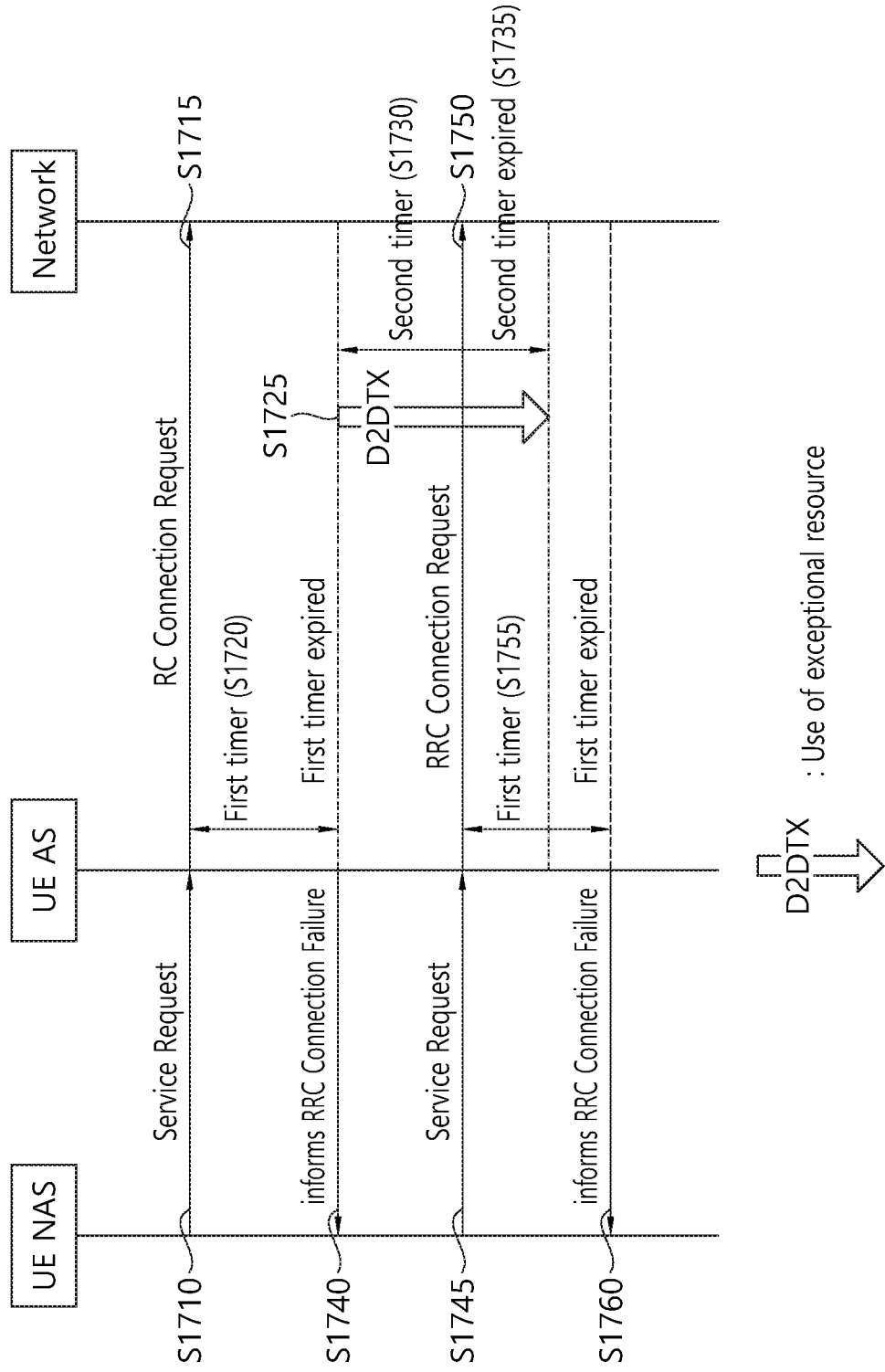
FIG. 17 is a flowchart of an exceptional resource use restriction process based on a timer according to another embodiment of the present invention.

FIG. 17 is a flowchart of an exceptional resource use restriction process based on a timer according to another embodiment of the present invention.

Referring to FIG. 17, in the RRC_IDLE state, the UE may receive a service request for D2D from an upper layer (S1710). In this case, the UE may denote a UE AS, and the upper layer may mean a UE NAS.

If the UE receives a service request for D2D from an upper layer, the UE may transmit an RRC connection request message to the network for an RRC connection attempt (S1715), and performs an RRC connection procedure. In this case, the details of the RRC connection request message and the RRC connection procedure are as described above.

TABLE 3

| Timer | Start | Stop | At expiry |
|---|---|---|---|
| T301 | Transmission of RRCConnectionReestabilshment Request | Reception of RRCConnectionReestablishment or RRCConnectionReestablishment Reject message as well as when the selected cell becomes unsuitable | Go to RRC_IDLE |
| T310 | Upon detecting physical layer problems for the PCell i.e. upon receiving N310 consecutive out-of-sync indications from lower layers | Upon receiving N311 consecutive in-sync indications from lower layers for the PCell, upon triggering the handover procedure and upon initiating the connection re-establishment procedure | If security is not activated: go to RRC_IDLE else: initiate the connection re-establishment procedure |
| T311 | Upon initiating the RRC connection reestablishment procedure | Selection of a suitable E-UTRA cell or a cell using another RAT. | Enter RRC_IDLE |

Entry condition in the RRC_IDLE state: If SIB 18 does not include the normal mode 2 resources and the UE performs the connection procedure, the UE may use the exceptional resources in the SIB 18 from the first T300 timer.

That is, in the RRC_IDLE state, the UE may start to use of an exceptional resource when the first timer expires, the first timer may be T300 of TS 36.331 described above, and the UE may mean the UE AS.

When the UE transmits an RRC connection request message to the network, the UE starts a first timer (S1720). The first timer may mean T300 in TS 36.331.

If the UE fails the RRC connection attempt until the first timer started by the UE expires and the UE is in the RRC_IDLE state, the UE starts to use the exceptional resource for D2D (S1725). The condition that the UE uses an exceptional resource for the D2D may be a case where the SIB 18 does not include a normal mode 2 resource and the UE performs the connection process. That is, if the first timer expires in the RRC_IDLE state, the UE may start to use the exceptional resource. In this case, the UE may perform the D2D operation based on an automatic resource selection in the exceptional resource pool.

When the first timer expires and the UE starts to use the exceptional resource, the UE starts a second timer (S1730). More specifically, when the first timer expires, the UE may start the second timer if the second timer is not in operation. Alternatively, when the first timer expires, if the second timer is in operation, the UE may restart the second timer. In this case, the second timer is a timer for preventing the UE from continuously using the exceptional resource, and the second timer may be a separate timer different from the first timer.

More specifically, the second timer may be determined as follows.

The value of the second timer may be the value of the NAS timer (e.g., NAS backoff timer)+alpha. In this case, the value of alpha may be a predetermined value or a value signaled from a serving cell.

The value of the second timer may be signaled from the serving cell. As an example in which the value of the second timer is signaled from the serving cell, the value of the second timer may be included in the SIB.

If the second timer expires, the UE may suspend use of the exceptional resource (S1735). In this case, in order to prevent the UE from continuing to enter an exceptional situation and using the exceptional resource again after the use of the exceptional resource is suspended, the UE may start a third timer which defers a time during which use of the exceptional resource is allowed after expiration of the second timer. That is, the UE may start the third timer after the second timer expires, and the UE may be prohibited from using the exceptional resource.

As an example of the above-described steps S1730 to S1735, the value of the second timer may be a predetermined value. That is, when the UE uses an exceptional pool in the RRC_IDLE state, the UE may use the exception pool only for a maximum of [xx] seconds. When the UE applies the exception pool to 3GPP TS36.331, it may be defined as the following table 4.

TABLE 4

| 5.X.4 Direct Communication transmission |
| --- |
| A UE capable of ProSe Direct Communication that is configured by upper layers to perform Direct Communication transmission and has related data to be transmitted shall:<br>  NOTE:  Only if the UE is authorised, upper layers configure the UE to perform a particular ProSe activity.<br>  1> If the cell used for ProSe Direct Communication is suitable as defined in TS 36.304 [4]:<br>    2> if T301, T310 or T311 is running and the PCell at which the UE detected radio link failure broadcasts SystemInformationBlockType18 including commTxPoolExceptional:<br>      3> transmit the scheduling assignment and the corresponding data, using the pool of resources indicated by commTxPoolExceptional, as specified in TS 36.321 [6];<br>    2> else if configured with commTxPoolNormalDedicated:<br>      3> transmit the scheduling assignment and the corresponding data, using the pool of resources indicated by commTxPoolNormalDedicated, as specified in TS 36.321 [6];<br>    2>    else if configured with sl-RNTI:<br>      3> request E-UTRAN to assign transmission resources for direct communication, as specified in TS 36.321 [6];<br>    2> else if the cell used for ProSe Direct Communication concerns a non-serving cell broadcasting SystemInformationBlockType18 including commTxPoolNormalCommon:<br>      3> transmit the scheduling assignment and the corresponding data, using the pool of resources indicated by commTxPoolNormalCommon, as specified in TS 36.321 [6];<br>  eNote  FFS whether to also support transmission on a non-serving frequency in idle mode also (might be sufficient to just move the two previous bullets below i.e. after the next bullet 2).<br>    2> else if camped normally on the cell used for ProSe Direct Communication (RRC_IDLE):<br>      3> if the cell used for ProSe Direct Communication broadcasts SystemInformationBlockType18 including commTxPoolNormalCommon:<br>        4> transmit the scheduling assignment and the corresponding data, using the pool of resources indicated by commTxPoolNormalCommon, as specified in TS 36.321 [6];<br>      3> else if the last connection establishment was initiated to request ProSe Direct Communication transmission resources and resulted in T300 expiry; and<br>      3> if the cell on which the UE initiated connection establishment broadcasts SystemInformationBlockType18 including commTxPoolExceptional:<br>        4> if UE is currently not allowed to use commTxPoolExceptionak and UE is not in prohibit duration for commTxPoolExceptional:<br>          5> from the moment T300 expired until receiving an RCConnectionReconfiguration including ProseCommConfig or until receiving an RRCConnectionRelease or an RRCConnectionReject or until at maximum of [xx]s followed by prohibit duration [yy] seconds during which UE is not allowed to use commTxPoolExceptional:<br>            6> transmit the scheduling assignment and the corresponding data, using the pool of resources indicated by commTxPoolExceptional, as specified in TS 36.321 [6];<br>  eNote  FFS whether there is a need for a (or another kind of) reject of a Prose Direct Communication Tx resource request, possibly specifically for the purpose of defining how long the UE may use the exceptional resources during connection establishment.<br>  eNote  TBC whether exceptional resources are used generally (as agreed also for use during establishment when no mode is assigned yet), or used only if e.g. configured with mode 1.<br>  1> else (out of coverage on ProSe carrier):<br>    2> transmit the scheduling assignment and the corresponding data, using the pool of resources that were preconfigured, as specified in TS 36.321 [6]; |

Referring to Table 4, in the RRC_IDLE mode, when the UE uses an exceptional resource for a maximum usable time (for example, 60 seconds) as described above, the UE is prohibited from using an exceptional resource for [yy] seconds. Therefore, even if the first timer (e.g., T300) is in operation or the T300 expires during the prohibition time associated with the second timer, the UE may not use an exceptional resource. Thereafter, when the UE enters the RRC_CONNECTED mode, the above prohibited time (i.e., [yy] seconds) is released. That is, the third timer is stopped. In this case, the above-mentioned 60 seconds means the above [xx] seconds. That is, the UE may use the exception resource only in [xx] seconds described above, and after [xx] seconds, the UE does not use the exception resource for a maximum [yy] time even if the T300 timer is in operation.

In step 1725, when the first timer expires and the UE starts to use the exceptional resource, the UE may inform the upper layer of RRC connection establishment failure information (S1740).

After the UE informs the upper layer of the RRC connection establishment failure information, the UE may receive the service request from the upper layer (S1745). In this case, the UE may restart the second timer. Specific contents of the UE receiving the service request from the upper layer are as described above.

When the UE receives a service request for D2D from an upper layer, the UE transmits an RRC connection request message to the network for an RRC connection attempt (S1750), and may perform an RRC connection procedure. The details of the RRC connection procedure of the UE are as described above.

When the UE transmits an RRC connection request message to the network, the UE may start the first timer (S1755).

Thereafter, if the first timer started in step S1755 has expired, the UE may inform the upper layer of RRC connection establishment failure information (S1760). In an exceptional resource use restriction process based on the timer according to FIG. 17, each step (S1710 to S1760) may be repeated.

Figure 18:
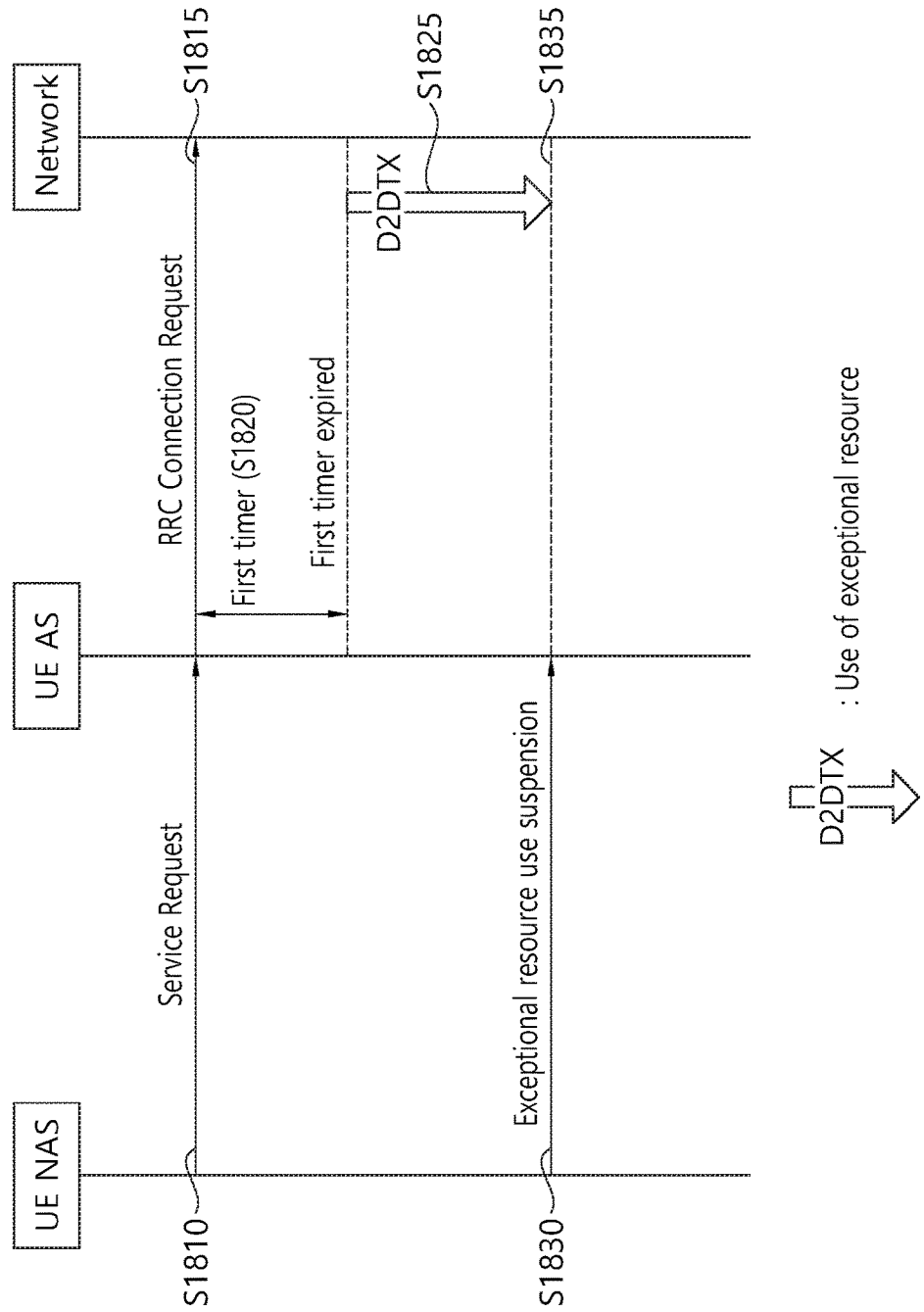
FIG. 18 is a flowchart illustrating an exceptional resource use restriction process based on the indication for suspending the use of the exceptional resource according to yet another embodiment of the present invention.

FIG. 18 is a flowchart illustrating an exceptional resource use restriction process based on the indication for suspending the use of the exceptional resource according to yet another embodiment of the present invention.

Referring to FIG. 18, in the RRC_IDLE state, the UE receives a service request for D2D from an upper layer (S1810). In this case, the UE may mean a UE AS, and the upper layer may mean a UE NAS.

When the UE receives a service request for D2D from an upper layer, the UE transmits an RRC connection request message to the network for an RRC connection attempt (S1815), and performs an RRC connection procedure. In this case, the details of the RRC connection request message and the RRC connection procedure are as described above.

When the UE transmits an RRC connection request message to the network, the UE starts the first timer (S1820). The first timer may mean T300 at TS 36.331.

If the UE fails the RRC connection attempt until the first timer started by the UE expires and the UE is in the RRC_IDLE state, the UE starts to use the exception resource for D2D (S1825). The condition that the UE uses an exceptional resource for the D2D may be a case where the SIB 18 does not include a normal mode 2 resource and the UE performs the connection process. That is, if the first timer expires in the RRC_IDLE state, the UE may start to use the exceptional resource. In this case, the UE may perform the D2D operation based on an automatic resource selection in the exceptional resource pool.

When the UE starts to use an exceptional resource, the UE may indicate to the upper layer of the UE that the UE is using an exceptional resource, and the UE may continue to use resources until the UE may receives from the upper layer, the indication for suspending the use of the exceptional resource The UE may receive information for suspending the use of exceptional resource from the upper layer (S1830). For example, the upper layer may send exceptional resource use discontinuation information when the service request to the UE for D2D fails five times consecutively.

In this case, the information for suspending the use of exceptional resource is as follows.
  information indicating that the higher layer instructs the UE to suspend using the exceptional resource, or
  information indicating that the upper layer has no resources to transmit to the UE for direct communication, or
  information indicating that the upper layer should suspend transmission on direct communication, or
  Information indicating that the upper layer should suspend establishing an RRC connection for direct communication When the UE receives the information for suspending the use of exceptional resource from the upper layer, the UE suspends using the exceptional resource (S1835).

Figure 19:
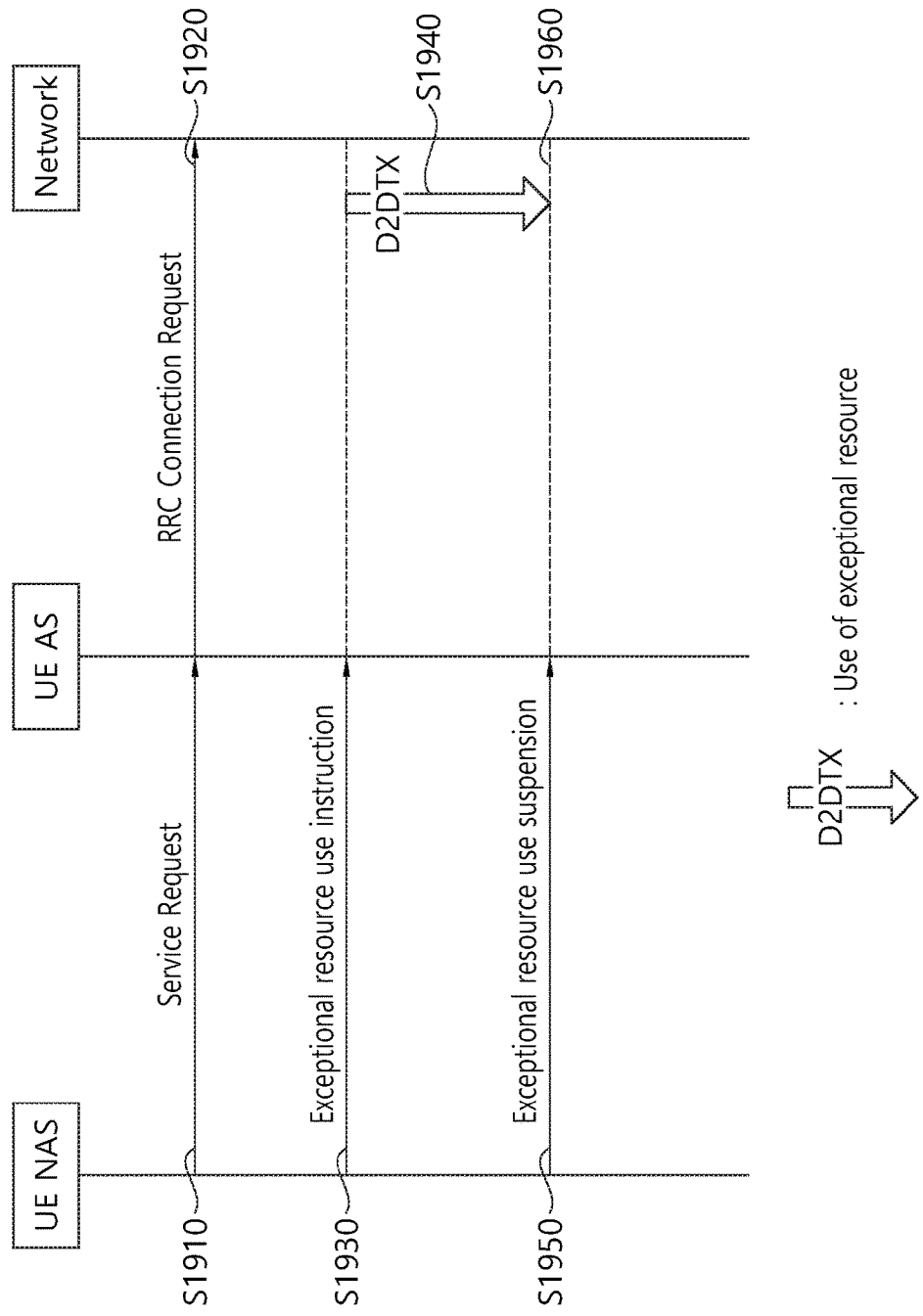
FIG. 19 is a flowchart illustrating an exceptional resource use restriction process based on the indication for suspending the use of the exceptional resource according to another embodiment of the present invention.

FIG. 19 is a flowchart illustrating an exceptional resource use restriction process based on the indication for suspending the use of the exceptional resource according to another embodiment of the present invention.

Referring to FIG. 19, in the RRC_IDLE state, the UE receives a service request for D2D from an upper layer (S1910). In this case, the UE may mean a UE AS, and the upper layer may mean a UE NAS.

If the UE receives a service request for D2D from an upper layer, the UE transmits an RRC connection request message to the network for an RRC connection attempt (S1920), and performs an RRC connection procedure. In this case, the details of the RRC connection request message and the RRC connection procedure are as described above.

The UE may receive information indicating the use of the exceptional resource from an upper layer (e.g., UE NAS or UE Prose layer) (S1930).

Then, the UE starts to use the exceptional resource based on the information indicating the use of the exceptional resource (S1940).

When the UE starts using an exceptional resource, the UE may indicate to the upper layer of the UE that the UE is using an exceptional resource, and the UE may continue to use the exceptional resource until the UE receives an instruction from the upper layer to suspend the use of the exceptional resource.

The UE may receive the information for suspending the use of exceptional resource from the upper layer (S1950). In this case, the information for suspending the use of exceptional resource is as described above.

When the UE receives the information for suspending the use of exceptional resource from the upper layer, the UE suspends using the exceptional resource (S1960).

Figure 20:
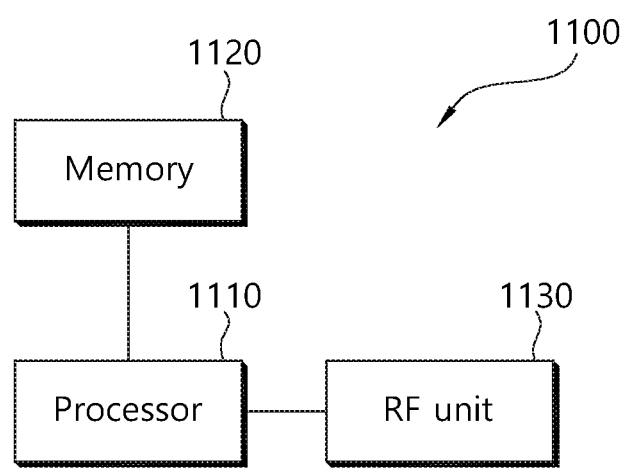
FIG. 20 is a block diagram showing a UE in which an embodiment of the present invention is implemented.

FIG. 20 is a block diagram showing a UE in which an embodiment of the present invention is implemented.

Referring to FIG. 20, a UE 1100 includes a processor 1110, a memory 1120, and a radio frequency unit (RF) unit 1130. Processor 1110 implements the proposed functionality, process and/or method. For example, processor 1110 may start to use of the exceptional resource through RF unit 1130.

In this case, the processor 1110 may determine whether a condition for suspending the use of the exceptional resource is satisfied through the RF unit 1130.

In this case, if the condition for suspending the use of the exceptional resource is satisfied, the processor 1110 may suspend the use of the exception resource through the RF unit 1130.

Further, in the RRC_IDLE state, the processor 1110 may receive a service request for the D2D from the upper layer through the RF unit 1130.

In this case, the processor 1110 may transmit an RRC connection request message for an RRC connection attempt through the RF unit 1130 to the network.

In this case, the processor 1110 starts a first timer through the RF unit 1130.

In this case, the processor 1110 starts to use the exceptional resource for the D2D through the RF unit 1130 until the first timer expires.

In this case, when the processor 1110 starts to use an exceptional resource through the RF unit 1130, it starts a second timer.

In this case, the processor 1110 may suspend the use of the exceptional resource through the RF unit 1130 when the second timer expires.

The RF unit 1130 is coupled to the processor 1110 to transmit and receive radio signals.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

What is claimed is:

1. A method for performing device-to-device (D2D) operation in a wireless communication system, the method performed by a user equipment (UE) and comprising:
   starting a first timer;
   if the first timer is expired:
      starting or restarting a second timer, and
      performing the D2D operation using an exceptional resource;
   determining whether a condition for stopping use of the exceptional resource is satisfied based on the whether the second timer is expired; and
   stopping the user of the exceptional resource when performing the D2D operation, based on the determination,
   wherein the condition for stopping the use is a stop condition in an RRC idle station,
   wherein, if the second timer is expired, the UE determines that the condition for stopping the use of the exceptional resource is satisfied, and
   wherein, if the first timer is expired while the second timer is not running, the UE starts the second timer, and if the first timer is expired while the second timer is already running, the UE restarts the second timer.

2. The method of claim 1,
   wherein a value of the second timer is signaled from a network.

3. The method of claim 1,
   wherein a value of the second timer is a predetermined value.

4. The method of claim 1,
   wherein when the UE receives a service request from an upper layer, the second timer is restarted.

5. The method of claim 1,
   wherein the second timer is different from the first timer.

6. The method of claim 1,
   wherein the first timer is a T300 timer.

7. The method of claim 1,
   wherein the condition for stopping the use is based on information indicating stop for the use of the exceptional resource, and
   wherein the information indicating stop for the use of the exceptional resource is received from an upper layer.

8. The method of claim 7,
   wherein the information indicating stop for the use of the exceptional resource is information indicating that the UE uses the exceptional resource.

9. The method of claim 7,
   wherein the information indicating stop for the use of the exceptional resource is information indicating that there are no resources to be transmitted for a direct communication with the UE.

10. The method of claim 7,
    wherein the UE receives, from the upper layer, information indicating that the exceptional resource is to be used, and
    wherein when the information indicating that the exceptional resource is to be used is received, the use of an exceptional resource is started.

11. A user equipment (UE), the UE comprising:
    a transceiver that transmits and receives a radio signal; and
    a processor operatively coupled to the transceiver,
    wherein the processor:
    starts a first timer;
    if the first timer is expired:
       starts or restarts a second timer, and
       performs device-to-device (D2D) operation using an exceptional resource;
    determines whether a condition for stopping use of the exceptional resource is satisfied based on whether the second timer is expired; and
    stops the use of the exceptional resource when performing the (D2D) operation, based on the determination,
    wherein the condition for stopping the use is a stop condition in an RRC idle state,
    wherein, if the second timer is expired, the UE determines that the condition for stopping the use of the exceptional resource is satisfied, and
    wherein, if the first timer is expired while the second timer is not running, the UE starts the second timer, and if the first timer is expired while the second timer is already running, the UE restart the second timer.

* * * * *